March 23, 1954
A. J. WHITE
2,672,756
APPARATUS TO INDICATE FLOW CONDITIONS
Filed Dec. 10, 1949
2 Sheets-Sheet 2
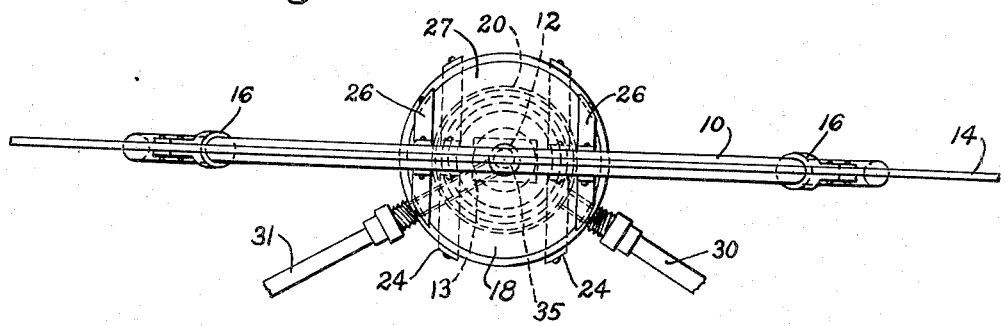
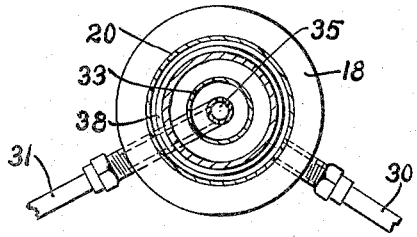
INVENTOR.
Andrew J. White
BY Harold E. Cole
Attorney Patented Mar. 23, 1954

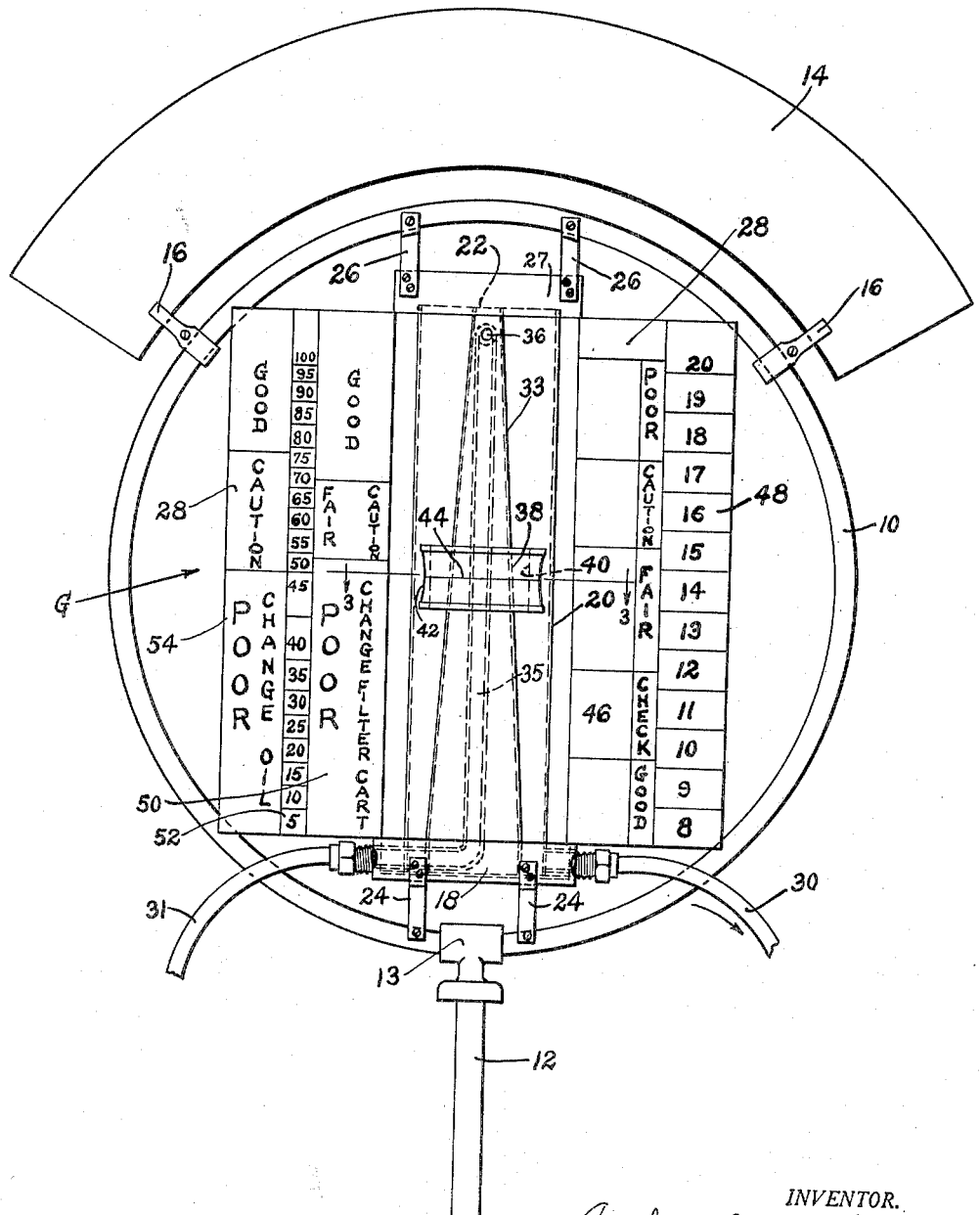

UNITED STATES PATENT OFFICE 2,672,756

2,672,756
APPARATUS TO INDICATE FLOW CONDITIONS

Andrew J. White, Lee, N. H.

Application December 10, 1949, Serial No. 132,325

5 Claims. (Cl. 73—215)

This invention relates to apparatus that indicates various conditions in the oil circulating system of a motor or in other liquid circulating systems.

One object of my invention is to provide apparatus that indicates the pressure of oil circulating in a motor, hence showing whether or not changes should be made in the oil or other parts of the system.

Another object is to provide apparatus by which the condition of the oil, as indicated by its color, can be compared with a color chart, to instantly check its condition.

A further object is to so construct said apparatus that its operation is simple and certain, and so that an inexperienced person could tell what conditions are in the oil circulating system.

The foregoing and other objects which will appear as the nature of the invention is better understood, may be accomplished by a construction, combination and arrangement of parts such as is disclosed by the drawings. The nature of the invention is such as to render it susceptible to various changes and modifications, and, therefore, I am not to be limited to the construction disclosed by the drawings nor to the particular parts described in the specification; but am entitled to all such changes therefrom as fall within the scope of my claims.

In the drawings:

Figure 1 is a front elevational view of my apparatus. Figure 2 is a top plan view thereof. Figure 3 is a sectional view taken on the line 3—3 of Figure 1.

As illustrated, my apparatus has a supporting means which as shown, includes a circular frame 10 to which a supporting staff 12 is attached by a connecting T 13. This staff may be attached to a floor stand, if desired. A name plate 14 is shown attached to said supporting frame 10 by clamps 16.

My indicating gauge G, which is supported by said supporting means, has a bottom member 18 later described. A glass or transparent tube 20 rests on said bottom member. Lower straps 24 are attached to said frame 10 and said bottom member 18. Said tube 20 has a top cover 22, and it is kept in vertical position with the aid of upper straps 26 that are attached to a plate 27 and to said frame 10. It is ordinarily circular in cross section and extends perpendicularly upward with relation to said bottom member.

Said gauge has a face member 28 attached to said frame 10, as by cement or solder, on which various indicia appear as later described, to which face member 28 said plate 27 is attached.

A conduit 30 is in communication with said bottom member 18 at one side, which conduit extends to and communicates with the oil line or circulatory system when in operation. At the other side of said bottom member another conduit 31 connects with said bottom member 18 and may communicate with an oil filter or another part of said oil line.

Within said tube 20 is a spindle 33 that tapers in width upwardly, being shown as an elongate cone, and which is spaced from said tube 20 laterally at all points so oil may flow and accumulate between said tube and spindle between the top and bottom thereof. Said spindle 33 has a hole or bore 35 extending longitudinally therethrough which is in communication with said conduit 31 whereby oil enters therefrom into said spindle 33 and flows therethrough and out of the discharge portion 36 of said hole 35 which is near the top and at the side of said spindle. Thence the oil passes downwardly in the space between the said tube 20 and spindle 33 and between the float and spindle. Thence it may pass out of said conduit 30 to recirculate in the oil system of the motor. Said conduit 30 has a capacity available for the flow of liquid less than said hole discharge portion 36.

Since ordinarily some oil will accumulate in said tube 20 it will have the effect of raising a float 38, that preferably is spool-shaped exteriorly as shown and which has a hole 40 through it whereby it is movably mounted on said spindle 20. Said float preferably extends almost to the side of said tube 20 and its outer edge is preferably dished as at 42 so that oil outside of it, between its top and bottom edges may be more clearly seen. The taper of the spindle 33 serves to vary the cubic capacity of the tube 20. The reduced capacity of said tube at the lower portion assures relatively quick movement upwardly of the float 38 when it is at the bottom or lower part of said tube. The increased capacity at the upper portion assures a slower movement of the float the higher it ascends.

A guide line 44 is marked on said float 38 to better identify the exact position of the float with respect to the markings on said gauge face 28, as explained later.

At the right of said tube 20 a color chart 46 may be provided on said gauge face 28 divided into rectangular sections by the horizontal lines shown. Each section is colored the same color as oil in a motor in varying conditions. For instance, the lowest section is colored the same as the color of new oil. The next section above has a color the same as used oil which should be checked for its impurities. The top section has a color the same as dirty oil which should be changed. To determine the condition of the motor oil, insofar as impurities are concerned, one only has to compare the color of the oil in said tube 20 with the various colors appearing on said chart 46.

Outside and to the right of said color chart 46 is a scale 48 of figures to indicate the pressure of the oil in the circulating system, which is determined by the position of said float 38.

At the left of said float 38 is a chart 50 which indicates the condition of the oil filter cartridge when the position of the float 38 is compared with the sections marked off on said chart 50. To the left of said chart 50 is a scale 52 to indicate the lubricating qualities in the oil compared to the position of said float 38. To the left of said scale 52 is a chart 54 which is divided into sections to tell what to do, if anything, about the oil in the circulating system, after comparing with the position of said float 38.

Of course, these scales and charts are convenient rather than indispensable; since the position of the float 38 in the tube 20 is the main indicator or tell-tale. The charts and scales assist a person in more quickly determining what the condition and pressure of the oil and oil filter are; and what to do about it, if anything.

My apparatus is used by connecting it to the oil circulatory system of a motor for the sole purpose of determining conditions in said oil system as explained. Also it could be permanently connected to said oil system so it always is in communication therewith whereby a motorist or other person can, at all times, tell at a glance what conditions are.

If desired, this apparatus could be connected to and made a part of the filtering device, and readily installed on an automobile or other apparatus along with the filter.

What I claim is:

1. Apparatus to indicate conditions in a liquid circulating system comprising supporting means, a bottom member supported thereby, a tube supported by said bottom member, a spindle within said tube extending upwardly in position of use and having a hole therein with a discharge opening for liquid to pass from said spindle to said tube, said bottom member having an opening therein, a conduit extending through said opening to and in communication with said spindle hole below said discharge opening, a float in said tube movably associated with said spindle and having an opening therein of greater width than said spindle whereby said spindle extends through said float which is movable upwardly and downwardly thereon, said float being of less width than said tube whereby it may move upwardly and downwardly therein, said bottom member having another opening therein, and a conduit extending into said latter opening and communicating with said tube.

2. Apparatus to indicate conditions in a liquid circulating system comprising supporting means, a bottom member supported thereby, a tube supported by said bottom member, a spindle within said tube extending upwardly in position of use and having a hole therein with a discharge opening for liquid to pass from said spindle to said tube, said bottom member having an opening therein, a conduit extending through said opening to and in communication with said spindle hole below said discharge opening, a float in said tube movably associated with said spindle and having an opening therein of greater width than said spindle whereby said spindle extends through said float which is movable upwardly and downwardly thereon, said float being of less width than said tube whereby it may move upwardly and downwardly therein and having its outer surface dished between its top and bottom, said bottom member having another opening therein, and a conduit extending into said latter opening and communicating with said tube.

3. Apparatus to indicate conditions in a liquid circulating system comprising supporting means, a bottom member supported thereby, a tube supported by said bottom member, a spindle within said tube extending upwardly in position of use and tapering in width upwardly, and having a hole therein with a discharge opening for liquid to pass from said spindle to said tube, said bottom member having an opening therein, a conduit extending through said opening to and in communication with said spindle hole below said discharge opening, a float in said tube movably associated with said spindle and having an opening therein of greater width than said spindle whereby said spindle extends through said float which is movable upwardly and downwardly thereon, said float being of less width than said tube whereby it may move upwardly and downwardly therein, said bottom member having another opening therein, and a conduit extending into said latter opening and communicating with said tube.

4. Apparatus to indicate conditions in a liquid circulating system comprising supporting means, a bottom member supported thereby, a tube supported by said bottom member of substantially uniform width throughout, a spindle within said tube extending upwardly in position of use and tapering in width upwardly and having a hole therein with a discharge opening for liquid to pass from said spindle to said tube, said bottom member having an opening therein, a conduit extending through said opening to and in communication with said spindle hole below said discharge opening, a float in said tube movably associated with said spindle and having an opening therein of greater width than said spindle whereby said spindle extends through said float which is movable upwardly and downwardly thereon, said float being of less width than said tube whereby it may move upwardly and downwardly therein, said bottom member having another opening therein, and a conduit extending into said latter opening and communicating with said tube.

5. Apparatus to indicate conditions in a liquid circulating system comprising supporting means, a bottom member supported thereby, a tube supported by said bottom member of substantially uniform width throughout, a spindle within said tube extending upwardly in position of use and tapering in width upwardly and having a hole therein extending from the bottom upwardly with a discharge opening for liquid to pass from said spindle to said tube in the upper portion thereof, said bottom member having an opening therein, a conduit extending through said opening to and in communication with said spindle hole below said discharge opening, a float in said tube movably associated with said spindle and having an opening therein of greater width than said spindle whereby said spindle extends through said float which is movable upwardly and downwardly thereon, said float being of less width than said tube whereby it may move upwardly and downwardly therein, said bottom member having another opening therein, and a conduit extending into said latter opening and communicating with said tube.

ANDREW J. WHITE.

References Cited in the file of this patent

UNITED STATES PATENTS

| Number | Name | Date |
|---|---|---|
| 1,178,193 | Trimbey | Apr. 4, 1916 |
| 1,202,977 | Drake | Oct. 31, 1916 |
| 1,980,761 | Mock et al. | Nov. 13, 1934 |
| 2,131,379 | Lay | Sept. 27, 1938 |
| 2,258,023 | McKernon | Oct. 7, 1941 |